US011708225B2

(12) United States Patent
Stauffer et al.

(10) Patent No.: US 11,708,225 B2
(45) Date of Patent: Jul. 25, 2023

(54) PRECISION FLOW FEEDING DEVICE

(71) Applicant: REEL Alesa AG, Zurich (CH)

(72) Inventors: Damian Stauffer, St. Gallen (CH);
Peter Meier, Würenlingen (CH)

(73) Assignee: REEL Alesa AG, Zurich (CH)

(*) Notice: Subject to any disclaimer, the term of this patent is extended or adjusted under 35 U.S.C. 154(b) by 19 days.

(21) Appl. No.: 17/600,673

(22) PCT Filed: Mar. 26, 2020

(86) PCT No.: PCT/EP2020/058558
§ 371 (c)(1),
(2) Date: Oct. 1, 2021

(87) PCT Pub. No.: WO2020/201015
PCT Pub. Date: Oct. 8, 2020

(65) Prior Publication Data
US 2022/0177238 A1 Jun. 9, 2022

(30) Foreign Application Priority Data

Apr. 4, 2019 (EP) .................................... 19167272

(51) Int. Cl.
*B65G 53/20* (2006.01)
*B65G 53/60* (2006.01)
(52) U.S. Cl.
CPC .............. *B65G 53/20* (2013.01); *B65G 53/60* (2013.01)
(58) Field of Classification Search
CPC .. B65G 53/20; B65G 2207/06; Y10S 414/101
(Continued)

(56) References Cited

U.S. PATENT DOCUMENTS 3,870,374 A * 3/1975 Wentzel, Jr. ........... B65G 53/20
406/89
4,016,053 A 4/1977 Stankovich et al.
(Continued)

FOREIGN PATENT DOCUMENTS

DE 102009014984 A1 * 10/2010 ............. B65G 53/20
EP 0 179 055 A1 4/1986
(Continued)

OTHER PUBLICATIONS

Written Opinion for PCT/EP2020/058558, dated Jun. 16, 2020.
International Search Report for PCT/EP2020/058558, dated Jun. 16, 2020.

*Primary Examiner* — Joseph A Dillon, Jr.
(74) *Attorney, Agent, or Firm* — Sughrue Mion, PLLC

(57) ABSTRACT

A device (1) for feeding a processing device with powdery material (2) comprises a first chamber (3) having at least one fluidizing device (5) configured to fluidize and/or to potentially fluidize the powdery material (2), at least one second chamber (6) being in connection with the first chamber (3) such that fluidized and/or potentially fluidized powdery material (2) is transportable from the first chamber (3) into the second chamber (6), and at least one third chamber (9) being in connection with the second chamber (6) such, that the potentially fluidized powdery material (2) is transportable from the second chamber (6) into the third chamber (9). The device (1) is configured to defluidize the powdery material (2) such that it is present as defluidized powdery material (2) in the third chamber (9). The third chamber (9) has a discharge element (10) configured to discharge the defluidized powdery material (2).

21 Claims, 10 Drawing Sheets

(58) Field of Classification Search
USPC .................................................. 406/87, 88
See application file for complete search history.

(56) References Cited

U.S. PATENT DOCUMENTS

| | | | | |
|---|---|---|---|---|
| 4,299,683 A * | 11/1981 | Adorno | ................ | B65G 53/60 |
| | | | | 204/247 |
| 4,355,929 A | 10/1982 | Snowdon | | |
| 4,450,053 A * | 5/1984 | Merz | ................ | C25C 3/14 |
| | | | | 204/245 |
| 4,659,263 A * | 4/1987 | Hanrot | ................ | B65G 53/20 |
| | | | | 406/89 |
| 4,692,068 A * | 9/1987 | Hanrot | ................ | C25C 3/14 |
| | | | | 406/123 |
| 4,747,732 A | 5/1988 | Hanrot et al. | | |
| 5,360,297 A * | 11/1994 | Enstad | ................ | B65G 53/22 |
| | | | | 406/89 |
| 6,190,235 B1 * | 2/2001 | Csabai | ................ | B03B 4/00 |
| | | | | 451/36 |
| 6,382,881 B1 * | 5/2002 | Gasquet | ................ | B65G 53/20 |
| | | | | 406/197 |
| 6,402,437 B1 * | 6/2002 | Gasquet | ................ | B65G 53/20 |
| | | | | 406/197 |
| 6,719,500 B2 * | 4/2004 | Pfeiffer | ................ | B65G 53/18 |
| | | | | 406/91 |
| 6,749,373 B2 * | 6/2004 | Von Geldern | ........ | B65G 53/528 |
| | | | | 110/186 |
| 6,986,625 B2 * | 1/2006 | Witheridge | ........... | B65D 88/72 |
| | | | | 406/138 |
| 7,021,870 B2 * | 4/2006 | Gille | ................ | B65G 53/50 |
| | | | | 406/93 |
| 7,048,475 B2 * | 5/2006 | Cloue | ................ | B65G 53/16 |
| | | | | 406/123 |
| 7,144,204 B2 * | 12/2006 | Hilgraf | ................ | B65G 53/20 |
| | | | | 406/89 |
| 7,192,222 B2 * | 3/2007 | Van Mullekom | .... | B65G 53/521 |
| | | | | 406/197 |
| 7,329,071 B2 * | 2/2008 | Sonnichsen | ........ | B65G 53/521 |
| | | | | 406/89 |
| 7,407,345 B2 * | 8/2008 | Karlsen | ................ | B65G 53/20 |
| | | | | 406/89 |
| 8,113,745 B2 * | 2/2012 | Aoki | ................ | B65G 53/525 |
| | | | | 406/197 |
| 8,425,159 B2 * | 4/2013 | Roumieu | ............... | B65G 53/16 |
| | | | | 406/89 |
| 9,090,413 B2 * | 7/2015 | Petit | ................ | B65G 53/20 |
| 9,382,079 B2 * | 7/2016 | Bjarno | ................ | C25C 3/14 |
| 9,834,733 B2 * | 12/2017 | Yamamoto | ............... | C10K 1/02 |
| 10,246,653 B2 * | 4/2019 | Soda | ................ | B65G 53/16 |
| 2004/0191007 A1 * | 9/2004 | Karlsen | ................ | C25C 3/14 |
| | | | | 406/90 |
| 2009/0269149 A1 * | 10/2009 | Hilgraf | ................ | B65G 53/28 |
| | | | | 406/155 |
| 2012/0230778 A1 * | 9/2012 | Petit | ................ | C25C 3/14 |
| | | | | 406/89 |
| 2013/0094912 A1 * | 4/2013 | Mauchle | ................ | B05B 14/45 |
| | | | | 406/122 |

FOREIGN PATENT DOCUMENTS

| | | | | |
|---|---|---|---|---|
| EP | 0 506 180 | A1 | 9/1992 | |
| EP | 1 086 035 | B1 | 9/2002 | |
| EP | 3181497 | B1 * | 2/2019 | |
| EP | 3750836 | A1 * | 12/2020 | ............ B65G 53/22 |
| FR | 2 534 891 | A1 | 4/1984 | |
| JP | 54-126383 | U | 9/1979 | |
| WO | 2004/033761 | A2 | 4/2004 | |
| WO | 2018/093268 | A1 | 5/2018 | |

* cited by examiner

PRECISION FLOW FEEDING DEVICE

CROSS REFERENCE TO RELATED APPLICATIONS

This application is a National Stage of International Application No. PCT/EP2020/058558 filed Mar. 26, 2020, claiming priority based on European Patent Application No. 19167272.4 filed Apr. 4, 2019.

TECHNICAL FIELD

The present invention relates to a device for feeding a processing device and a method for feeding a processing device using such a device.

PRIOR ART

Devices for feeding materials are well known in the art. Said devices are subject to many requirements, such as the maintenance of a stable feed or a continuous feed of the powdery material regulated as a function of consumption requirement of the said material. A conveyance of the powdery material in a fluidized or potentially fluidized condition has proven to be advantageous. To this end EP 1 086 035 B1 discloses a device for conveying powdery materials between a storage area and an area to be supplied, wherein the powdery materials are conveyed in a potential fluidization hyperdense bed controlled by a bubble pressure.

Such devices generally deal with aspects regarding mainly the transportation of the material to the feeding area. However, a disadvantage of these devices is that a fluidizing gas has to be used in order to fluidize or potentially fluidize the powdery material, wherein at least part of said fluidizing gas is still present in the powdery material when the latter is to be fed. This leads to inaccurate quantities being discharged.

SUMMARY OF THE INVENTION

It is an object of the present invention to provide a device for feeding a processing device which enables a precise feeding.

In particular, a device for feeding a processing device with powdery material, in particular bulk material, is provided, which comprises a first chamber having a receiving opening for receiving the powdery material within the first chamber and at least one fluidizing device configured to fluidize and/or to potentially fluidize the powdery material within the first chamber by a fluidizing gas. The device further comprises at least one second chamber having an outlet opening, wherein the second chamber is in connection with the first chamber via a passage, such that fluidized and/or potentially fluidized powdery material is transportable from the first chamber into the second chamber. The second chamber is closed off in an air-tight manner towards an outside such, that the second chamber is capable of compensating a fluidizing pressure of the fluidizing gas so that the fluidized powdery material within the second chamber is potentially fluidized and/or so that the potentially fluidized powdery material within the second chamber remains potentially fluidized. The potentially fluidized powdery material is dischargeable from the second chamber via the outlet opening. The device further comprises at least one third chamber, wherein the third chamber is in connection with the second chamber via the outlet opening such, that the potentially fluidized powdery material is transportable from the second chamber into the third chamber. The device is configured such, that the potentially fluidized powdery material is defluidized and is present as defluidized powdery material in the third chamber. The third chamber has a discharge element configured to discharge the defluidized powdery material.

That is, the present device enables a fluidization and/or a potential fluidization of powdery material in the first chamber; a transportation of said fluidized and/or potentially fluidized powdery material from the first chamber into the second chamber; a potential fluidization of the fluidized powdery material or the maintenance of the potentially fluidized state of the powdery material in the second chamber; a transportation of the potentially fluidized powdery material from the second chamber into the third chamber; and a defluidization of the potentially fluidized powdery material such that it is present as defluidized powdery material in the third chamber. Hence, in the third chamber the powdery material is again in its original form, i.e. a powdery material per se, which is essentially free from the fluidizing gas. Due to the absence of fluidizing gas in said powdery material any turbulences caused by the presence of a gas or variations in the density of the powdery material or reduced friction between the particles of fluidized powdery material are prevented. As a result a precise and steady discharging of said powdery material from the third chamber and thus feeding of the processing device is possible.

Fluidized powdery material means that the particles constituting the powdery material are set in motion and lifted by the fluidizing gas such that the particles are put into a state wherein the friction between the particles is strongly reduced such that the powdery material as a whole assumes a fluid-like state. In the case of a strong fluidisation the particles can even be put into a state of dynamic suspension. Potentially fluidized powdery material means that the fluidizing gas present between the particles constituting the powdery material has no or almost no velocity. As a result the powdery material appears as a hyperdense potential fluidization bed. If the powdery material is fluidized or potentially fluidized depends from different conditions. For example, by imposing a high gas flow of the fluidizing gas the powdery material is fluidized. However, it is also conceivable to fluidize the powdery material by providing the first chamber being opened towards an outside. On the other side it is conceivable to potentially fluidize the powdery material by providing the first chamber as a chamber being essentially closed where there is no or almost no interaction between an interior of the first chamber and an outside. In this case the first chamber is ideally closed off in an air-tight manner towards the outside or sealed off with a material column. These two conditions are well known in the field of the art, see for example the disclosure in EP 1 086 035 B1 and the documents U.S. Pat. No. 4,016,053 and EP 0 179 055 mentioned therein.

Due to the fact that the second chamber is closed off in an air-tight manner towards the outside, conditions for potential fluidization of the powdery material are created. Namely, the second chamber thereby takes the form of a balancing column, wherein a filling height of the powdery material within the second chamber balances the pressure of the fluidization gas present in the device. Also this phenomenon is well known to the skilled person in the art, see e.g. explanations provided in U.S. Pat. No. 4,747,732.

Hence, the first chamber can be closed off in an essentially air-tight manner towards the outside and can be configured to potentially fluidize the powdery material. Alternatively, the first chamber can be at least partially opened towards the outside and can be configured to fluidize the powdery material.

The fluidizing device used in the device according to the present invention is a fluidization device as it is commonly known in the art. It comprises a gas-permeable element such as a textile or fabric or porous wall, wherein fluidizing gas permeates through the pores of the textile or fabric or porous wall. In the presence of a fluidizing gas the powdery material is then transported along the gas-permeable element. Hence, the gas-permeable element can be seen as defining a transport surface along which the powdery material is transported. Moreover, said gas-permeable element can be arranged on or in a housing which is in turn arranged within the first chamber. By connecting one or more gas inlets to the gas-permeable element or the housing and one or more gas supply lines to said gas inlets a fluidizing gas can be introduced into the first chamber. In order to ensure that the powdery material is transportable along an entire length of the first chamber the transport surface, i.e. the gas-permeable element, preferably extends along the entire length of the first chamber.

The first chamber and/or the second chamber and/or the third chamber in each case preferably delimit an interior space. To this end it is conceivable that the interior space is delimited by walls of the chambers. In other words, it is preferred that the chambers in each case define a housing. The interior space defined by the second chamber is closed-off towards an outside. The interior space defined by the first chamber and/or the third chamber can be closed-off or opened towards an outside. For example, the first chamber could comprise side walls extending along a vertical direction and being connected to a bottom wall extending along a horizontal direction running perpendicularly to the vertical direction. In this case the side walls and the bottom wall delimit an interior space. It is furthermore conceivable that the first chamber also comprises a top wall extending along the horizontal direction, as well. Likewise, it is conceivable that the second chamber and/or the third chamber comprises side walls running along the vertical direction. Moreover, when the device is seen in an installed position the first chamber and the second chamber are preferably arranged adjacent or spaced apart from one another with respect to the horizontal direction. Furthermore, when the device is seen in the installed position, the third chamber is preferably arranged adjacent or spaced apart from the second chamber with respect to the vertical direction. The installed position is understood herein as a state wherein the device is capable for feeding the processing device. i.e. wherein the device is assembled.

The device can further comprise an intermediate device, wherein the first chamber and the second chamber are in connection with one another via said intermediate device. To this end, it is particularly preferred that said intermediate device is in connection with the passage and/or comprises said passage. In fact, a connection between the first chamber and the second chamber could be such, that the first chamber is in connection with the intermediate device, that the intermediate device is in connection with the passage and/or encompasses the passage, and that the passage, potentially together with the intermediate device, in turn is connected to the second chamber. For example, the intermediate device can be configured as a tube or pipe that extends from the first chamber and that merges into or connects to the passage or which comprises the passage. This tube or pipe could be formed as an integral part of the first chamber, in particular of a wall of the first chamber, or it could be attached to the first chamber, in particular to a wall of the first chamber.

It is furthermore preferred that the intermediate device comprises one or more fluidizing devices that are configured to fluidize and/or potentially fluidize the powdery material by a fluidizing gas as described above. In this way it can be ensured that the powdery material being received in the first chamber can be transferred to the second chamber via the intermediate device while still being fluidized and/or potentially fluidized.

It is additionally preferred that the intermediate device is configured to deflect or guide fluidizing gas from the intermediate device into the first chamber and/or towards an outside. That is, it is preferred that fluidizing gas that is delivered by the one or more fluidizing devices into the intermediate device can be transferred from the intermediate device into the first chamber. Additionally or alternatively it is conceivable that the intermediate device comprise one or more ventilation openings which connect an interior of the intermediate device with an outside such that the fluidizing gas can be discharged via the ventilation openings. Said one or more ventilating openings are preferably provided in an upper region, particularly in a top wall of the intermediate device. To this end the intermediate device can comprise at least one deflection element. Said deflection element is preferably arranged above the one or more fluidizing devices when the device is seen in the installed position. In other words, the deflection element is preferably arranged before the fluidizing device(s) when seen along the vertical direction extending from the receiving opening of the first chamber towards the fluidizing device(s) of the first chamber. The deflection element is preferably configured as an integral part of the intermediate device. The deflection element particularly preferably corresponds to a wall of the intermediate device which is arranged and configured such that it can deflect or guide fluidizing gas from the intermediate device into the first chamber. Ideally, said wall is an upper wall of the intermediate device being arranged opposite to the fluidizing device(s) of the intermediate device. However, it is likewise conceivable that the deflection element is an element that is configured separate from the intermediate device and which is attached to or otherwise mounted within the intermediate device. For example, it could be configured as an element that is attached to an upper wall of the intermediate device.

In any case it is preferred that the deflection element is arranged with an inclination, wherein said inclination runs upwards when the device is seen in the installed position and when seen from the second chamber in the direction of the first chamber. In other words, it is preferred that said upwardly running deflection element defines an angle of inclination between the deflection element and the horizontal direction running perpendicularly to the vertical direction. That is, said angle of inclination is preferably formed between the deflection element and a bottom of the intermediate device. Said bottom is understood here as the part of the intermediate device wherein the one or more fluidizing devices are provided. Said angle of inclination is preferably in the range of about 10° to 80°, more preferably in the range of about 20° to 50°, even more preferably in the range of about 20° to 30°. Because said inclination serves the purpose of venting the intermediate device, said angle of inclination is referred to herein as venting angle.

The device is preferably configured to maintain the powdery material under its angle of repose within the first chamber in the absence of the fluidizing gas. In the context of the present invention the term "angle of repose" is used in its general meaning, i.e. the steepest slope of the powdery material, measured from a horizontal plane on which the powdery material can be heaped without collapsing. This means that the device is configured such that a transport of the fluidized powdery material and/or of the potentially fluidized powdery material from the first chamber into the second chamber is enabled but a transport of the defluidized or non-fluidized powdery material from the first chamber into the second chamber in the absence of fluidizing gas is prevented. In this way it is ensured that only fluidized and/or potentially fluidized powdery material is transported from the first chamber into the second chamber whereas the non-fluidized or defluidized powdery material remains within the first chamber.

This can be achieved in various ways. For example, the first chamber can comprise in a region of the passage a limiting element, which limits a passageway formed between the limiting element and the first chamber. Alternatively, it is conceivable that the first chamber in the region of the passage is in connection with a limiting element that limits a passageway formed between the limiting element and the first chamber. That is, in the former case the limiting element is arranged within the first chamber, whereas in the latter case the limiting element is arranged outside of the first chamber but is in connection with the first chamber. A ratio between a cross-section of the passageway is in any case chosen such that an angle between an underside of the passageway and a length of an underside of the passageway relate to an angle that equals to or is smaller than the angle of repose of the powdery material. Alternatively, a ratio between a cross-section of the passage and a length of an underside of the passage can relate to an angle that is equal to or smaller than the angle of repose of the powdery material. The intermediate device is preferably in connection with the limiting element and therefore with the passageway, as well. For example, the intermediate device could be arranged between the first chamber and the limiting element such, that the passageway can extend into the intermediate device.

The first chamber and the second chamber can be arranged immediately adjacent to one another. In this case it is preferred that the passage is provided by a through-opening extending through a wall of the first chamber and a wall of the second chamber. For example, and as already indicated above, the first chamber and the second chamber could be arranged immediately adjacent to one another with respect to the horizontal direction. Moreover, in order to maintain the powdery material under its angle of repose within the first chamber in the absence of the fluidizing gas it is preferred to use a limiting element limiting a passageway formed between the limiting element and the first chamber as described above.

Alternatively, the first chamber and the second chamber can be arranged at a lateral distance from one another. In this case it is preferred that the passage is provided by a tube extending between an opening in the wall of the first chamber and an opening in the wall of the second chamber. For example, and as already indicated above, the first chamber and the second chamber could be arranged at a lateral distance from one another with respect to the horizontal direction. The tube then likewise preferably extends along the horizontal direction. Moreover, in order to maintain the powdery material under its angle of repose within the first chamber in the absence of the fluidizing gas it is preferred to use a passage or tube having a cross-section which is dimensioned such that an angle between an underside of the passage and the (fictitious) diagonal essentially corresponds to the angle of repose of the powdery material as described above.

The third chamber can comprise at least one equalizing element being configured to remove the fluidizing gas from the third chamber, whereby the potentially fluidized powdery material is defluidized, wherein at least one equalizing element is preferably provided by means of at least one opening in the third chamber through which the fluidizing gas is removable from the third chamber and transferable to the outside, and/or wherein the at least one equalizing element is preferably configured to establish a fluid connection between the third chamber and the processing device, wherein the fluidizing gas is removable from the third chamber and transferable to the processing device via said equalizing element. That is, several ways of removing the fluidizing gas from the third chamber and thereby from the powdery material are conceivable. Namely, by providing one or more openings in the third chamber through which the fluidizing gas can escape into the outside. The resulting defluidized powdery material is then at atmospheric pressure. It is however also conceivable to provide one or more tubes or the like by means of which the third chamber is connected with the processing device and by means of which the fluidizing gas is transported from the third chamber into the processing device. The resulting pressure within the third chamber then corresponds to the pressure present in the processing device. However, and as will be explained in more detailed below, it is additionally or alternatively also conceivable that a defluidization of the powdery material is achieved by means of the particular design of the second chamber and the third chamber.

It is preferred that a cross-section of the outlet opening of the second chamber is larger than a cross-section of the discharge element of the third chamber. In addition, depending on the dimension of the cross-section of the discharge element of the third chamber are discharging of small amounts of defluidized powdery material per unit of time in case of a small cross-section or a discharging of large amounts of defluidized powdery material per unit of time in case of a large cross-section from the third chamber can be achieved.

The outlet opening of the second chamber and the third chamber are preferably in connection with one another via a pipe, wherein the pipe extends from the outlet opening of the second chamber along an outlet direction at least partially into a volume of the third chamber. That is to say it is conceivable to provide the second chamber with a pipe that surrounds the outlet opening of the second chamber such that the potentially fluidized powdery material is discharged from the second chamber into the third chamber via said pipe. It should be noted that the pipe can be provided in different forms. For example, the pipe can have a cylindrical or quadratic form. Moreover, and as mentioned above, the pipe can additionally or alternatively serve the purpose of defluidizing the powdery material. Namely, a defluidization of the potentially fluidized powdery material can occur while said powdery material travels from the second chamber into the third chamber. The pipe effectuates that the fluidizing gas escapes from the powdery material within the pipe and back into the second chamber. It is thus possible that a defluidization of the powdery material is achieved even in the absence of an equalizing element in the third chamber. As already mentioned above, the third chamber is preferably arranged below the second chamber with respect to the vertical direction. In this case it is furthermore preferred if said pipe extends along the vertical direction, as well.

The pipe can have a length along the outlet direction being such, that a region between an end of the pipe that is facing the third chamber and an underside of the third chamber is delimited, wherein a sealing of the second chamber against the third chamber due to powdery material being accumulated in said region is achieved. In other words, it is preferred to provide the pipe with a length that is such that powdery material can accumulate within the third chamber beneath the pipe to a height wherein it reaches at least up to a distal end of the pipe facing the third chamber. Powdery material that reaches at least up to the distal end of the pipe seals the second chamber against the third chamber.

The first chamber can comprise at least one channel along which the powdery material is transportable and fluidizable and/or potentially fluidizable by the fluidizing device, and the fluidizing device can comprise a gas-permeable element, wherein a cross-section of the channel essentially equals a cross-section of the gas-permeable element, or wherein a cross-section of the gas-permeable element is larger than a cross-section of the channel. In doing so an essentially entire fluidization and/or potential fluidization of the powdery material present within the channel is achieved.

The device can further comprise a cleaning device being configured to clean the discharge element of the third chamber, and/or the device can further comprise a detection device configured to detect a condition of the discharge element of the third chamber. The presence of a cleaning device prevents or, if already established, removes a clogging of the discharge element. The cleaning device can have the form of a piston which is mounted displaceable in the third chamber and which can be advanced through the discharge element in order to eject any powdery material or foreign particles that has accumulated within the discharge element. The detection device can be configured to detect a discharging of the powder material through the discharge element, wherein an irregular or outstanding discharging is indicative of a clogged discharge element. The detection device and the cleaning device are preferably in communication with one another such that the detection device can trigger a cleaning event in case that it detects a clogged discharge element.

The first chamber can comprise at least two channels being in communication with one another and at least two fluidizing devices, wherein in each case one fluidizing device is arranged in one channel, and wherein one of the fluidizing devices is configured to transport and fluidize and/or potentially fluidize the powdery material and the other of the fluidizing devices is configured to transport the fluidized and/or potentially fluidized powdery material from the first chamber into the second chamber.

For example, the first chamber can comprise a first channel and a second channel which extend parallel to one another along an extension direction, wherein the channels are separated from one another by a separating element mounted within the first chamber such as a partition wall which likewise extends along the extension direction. In order to allow a communication between the two channels it is preferred that the separating element does not extend until an underside of the first chamber but only to an extent such that a passage between the two channels remains free. A fluidizing device can be arranged within each channel, wherein the fluidizing device of the first channel is for example configured to transport the powdery material along the first channel and to fluidize and/or potentially fluidize the powdery material within said first channel. The thus fluidized and/or potentially fluidized powdery material can then be transferred from the first channel into the second channel via the passage being left free by the separating element. The fluidized and/or potentially fluidized powdery material can then be transferred from the second channel into the second chamber by means of the fluidizing device arranged in the second channel.

The first chamber and the second chamber can be located at a same height or at a different height when seen in the installed position, and/or the third chamber can be located below the second chamber when seen in the installed position. If the first chamber comprises two or more channels and two or more fluidizing devices, said two or more channels and/or said two or more fluidizing devices can be arranged at a same height or at a different height, too. Different height positions can have a favourable effect on the transfer of the powdery material. For example, a first fluidizing device being arranged higher than a second fluidizing device brings the advantage of a simplified transfer of the powdery material from the first channel into the second channel due to the slope established between the fluidizing devices. Likewise a third chamber being located below the second chamber has the advantage that the powdery material can be transferred from the second chamber into the third chamber without the need of any auxiliary means but by means of gravity only. The first chamber preferably has an essentially elongated shape extending along an extension direction, and wherein two or more second chambers and two or more third chambers are arranged at a distance from one another along the extension direction.

That is, it is conceivable to provide a variety of second and third chambers so that powdery material can be discharged at many different locations. It should be understood that any explanations provided with regard to one second and third chamber herein above or below likewise apply if two or more second and third chambers are present. Hence, the second chamber and its associated third chamber can be seen as a unit that serve as one feeding point, wherein several such units result in several feeding points which in turn enable a feeding of the powdery material at various locations. Moreover, the particular design and interaction of the first, second and third chambers as outlined above enables a precise feeding at the various feeding points.

In another aspect a method for feeding a processing device with powdery material, in particular bulk material, using a device as described above is provided, wherein the method comprising the steps of;

Providing powdery material into the first chamber;

Fluidizing and/or potentially fluidizing the powdery material within the first chamber by introducing fluidizing gas from the fluidizing device into the first chamber;

Transporting the fluidized and/or potentially fluidized powder material from the first chamber into the second chamber, whereby the fluidized powder material is potentially fluidized and/or the potentially fluidized powdery material remains potentially fluidized;

Discharging the potentially fluidized powdery material from the second chamber into the third chamber;

Defluidizing the potentially fluidized powdery material in the third chamber; and Discharging the defluidized powdery material from the third chamber.

The just mentioned steps are preferably carried out in this sequence. Moreover, the just mentioned steps preferably correspond to one feeding cycle. Once said feeding cycle has terminated and the defluidized powdery material is discharged from the third chamber, the above steps are performed again.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
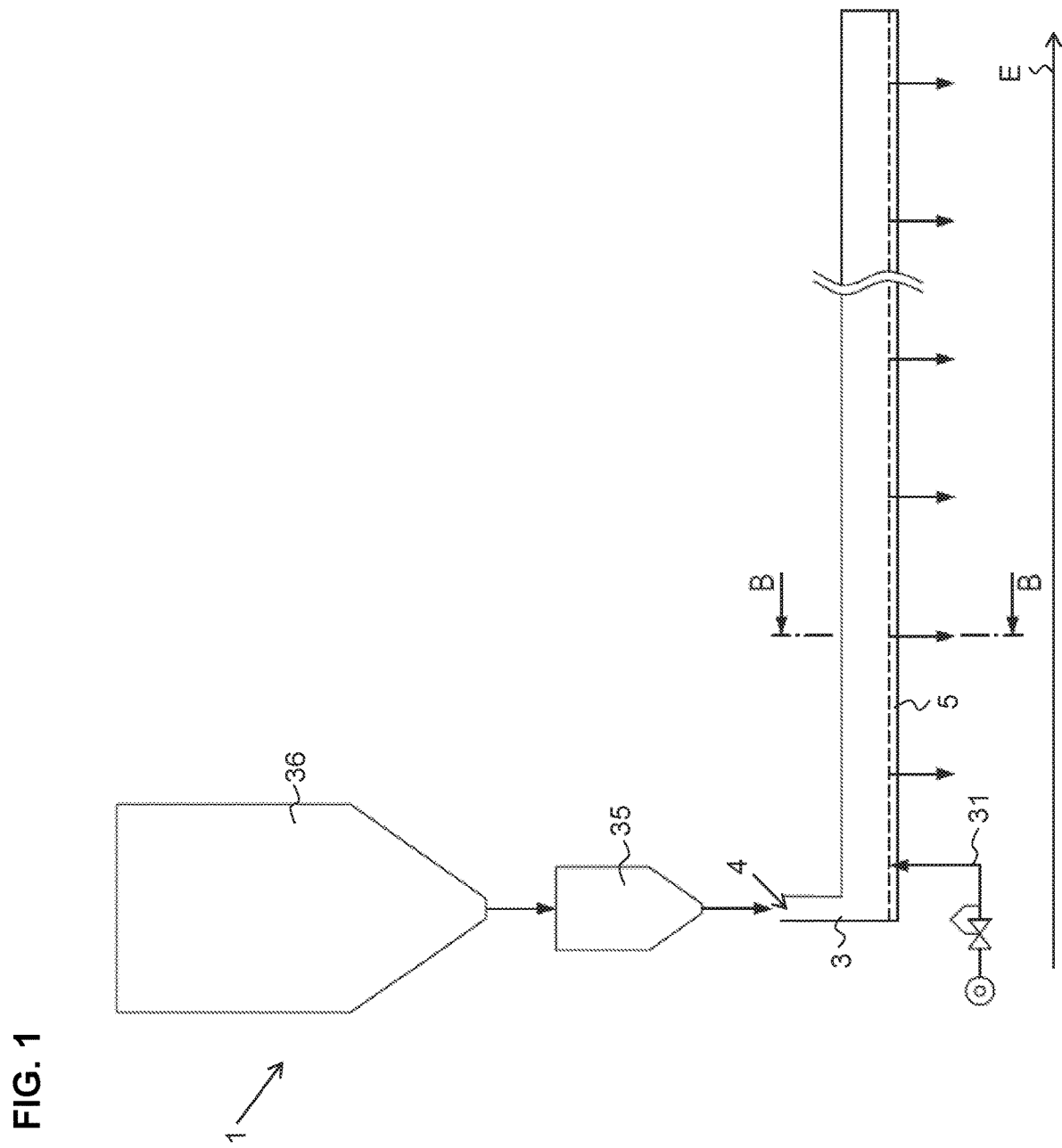
FIG. 1 shows a schematic side view of a device for feeding a processing device, wherein a buffer bin and a weight bin are also depicted.

Different aspects of a device 1 for feeding a processing device (not shown) with powdery material 2 are depicted in FIGS. 1 to 10.

In particular, said device 1 comprises a first chamber 3 having an elongated shape extending along an extension direction E, and wherein two or more second chambers 6 and two or more third chambers 9 are arranged at a distance from one another along the extension direction E. The following explanations are provided with respect to one second chamber 6 and one third chamber 9 for reasons of simplicity. It should be understood however that these explanations likewise apply to the two or more second chambers 6 and the two or more third chambers 9, respectively.

As best seen in FIGS. 2 to 9, the first chamber 3, the second chamber 6 and the third chamber 9 in each case delimit an interior space 52, 53, 54. In fact, the first chamber 3 comprises side walls 21, 21' running along a vertical direction V and a bottom wall 37 running along a horizontal direction H extending perpendicularly to the vertical direction V. Moreover, in the device 1 according to FIGS. 2, 4, 6 and 10 the first chamber 3 also comprises a top wall 55, such that the first chamber 3 delimits an interior space 52 that is closed-off towards an outside. This is in contrast to the device 1 according to FIGS. 3, 5 and 7, wherein the first chamber 3 does not comprise a top wall such that its interior space 52 is opened towards an outside. However, it should be noted that it is likewise conceivable to provide a first chamber 3 having a top wall 55 that comprises one or more opening connections through which the fluidizing gas can be sucked out of the first chamber 3. Also the second chamber 6 and the third chamber 9 comprises in each case walls 22, 22', 41, 56 that delimit the respective interior space 53, 54. Moreover, w % ben seen in the installed position as it is the case here, the first chamber 3 and the second chamber 6 are arranged adjacent (see FIGS. 2-7) or spaced apart from one another (see FIGS. 8-10) with respect to the horizontal direction H. Furthermore, when the device 1 is seen in the installed position, the third chamber 9 is below the second chamber 6 with respect to the vertical direction V.

The first chamber 3 has a receiving opening 4 for receiving the powdery material 2 within the first chamber 3. In the embodiment depicted in FIG. 1 the receiving opening 4 is located below a weight bin 35 arranged on a scale. The weight bin 35 in turn is arranged below a buffer bin 36 comprising the powdery material 2 to be discharged. Hence, in a first step powdery material 2 from the buffer bin 36 is discharged into the weight bin 35, wherein the scale determines the weight of the powdery material 2. When a preselected amount of powdery material 2 is discharged into the weight bin 35, a further discharging of powdery material 2 from the buffer bin 36 into the weight bin 35 is interrupted and the preselected amount of powdery material 2 is discharged from the weight bin 35 into the first chamber 3 through its receiving opening 4.

At least one fluidizing device 5 is arranged within the first chamber 3. A fluidizing gas, for example air or nitrogen, can be discharged via the fluidizing device 5 into the first chamber 3, whereby the powdery material 2 within the first chamber 3 is fluidized and/or potentially fluidized and transported along the extension direction E. Hence, in the embodiments depicted in FIGS. 2.4 and 6 the first chamber 3 is provided as an essentially closed chamber wherein only the receiving opening 4 is present. As a result the powdery material 2 discharged from the weight bin 35 into the first chamber 3 is potentially fluidized within the first chamber 3. In the embodiments depicted in FIGS. 3, 5 and 7 however an upper side of the first chamber 3 is opened, i.e. the first chamber 3 is provided by means of the two side walls 21, 21' and the bottom wall 37. The powdery material 2 in these embodiments is fluidized.

As best seen in FIGS. 2 to 6 the second chamber 6 is in connection with the first chamber 3 via a passage 8, wherein the fluidized and/or potentially fluidized powdery material 2 is transportable from the first chamber 3 into the second chamber 6 via said passage 8. The device 1 according to these figures comprises a passage 8 that is provided by a through-opening 23 extending through a wall 21 of the first chamber 3 and a wall 22 of the second chamber 6. Here, the first chamber 3 and the second chamber 6 are thus arranged essentially immediately adjacent to one another. In addition, the device 1 is configured to maintain the powdery material 2 under its angle of repose a within the first chamber 3 in the absence of the fluidizing gas. Namely, in the device 1 according to FIGS. 2 and 3 the first chamber 3 comprises in a region of the passage 8 a limiting element 11 which is configured to limit a passageway 12 formed between the limiting element 11 and the first chamber 3. Moreover, a ratio between a cross-section dw of the passageway 12 and a length LW of an underside 13 of the passageway 12 are chosen such that the ratio relates to an angle β that essentially equals the angle of repose a of the powdery material 2. In the device 1 according to FIGS. 4 to 6 a ratio between a cross-section dp of the passage 8 and a length LP of an underside 17 of the passage 8 are chosen such that the ratio relates to an angle γ that essentially corresponds to the angle of repose a of the powdery material 2. As will be explained in greater detail below the fluidizing device 5 can be provided by means of a gas-permeable element 43 mounted in a housing 44. As follows from FIGS. 4 to 6, the underside 17 of the passage 8 is in this case provided by means of an upper side of the housing 44. Both designs result in the fact that powdery material 2 that is present in the first chamber 3 after a fluidization or potential fluidization by means of the injection of fluidizing gas into the first chamber 3 has been discontinued remains in the first chamber 3 and is prevented by the passageway 12 or the tube 24, respectively, from thrikling into the second chamber 6.

Figure 2:
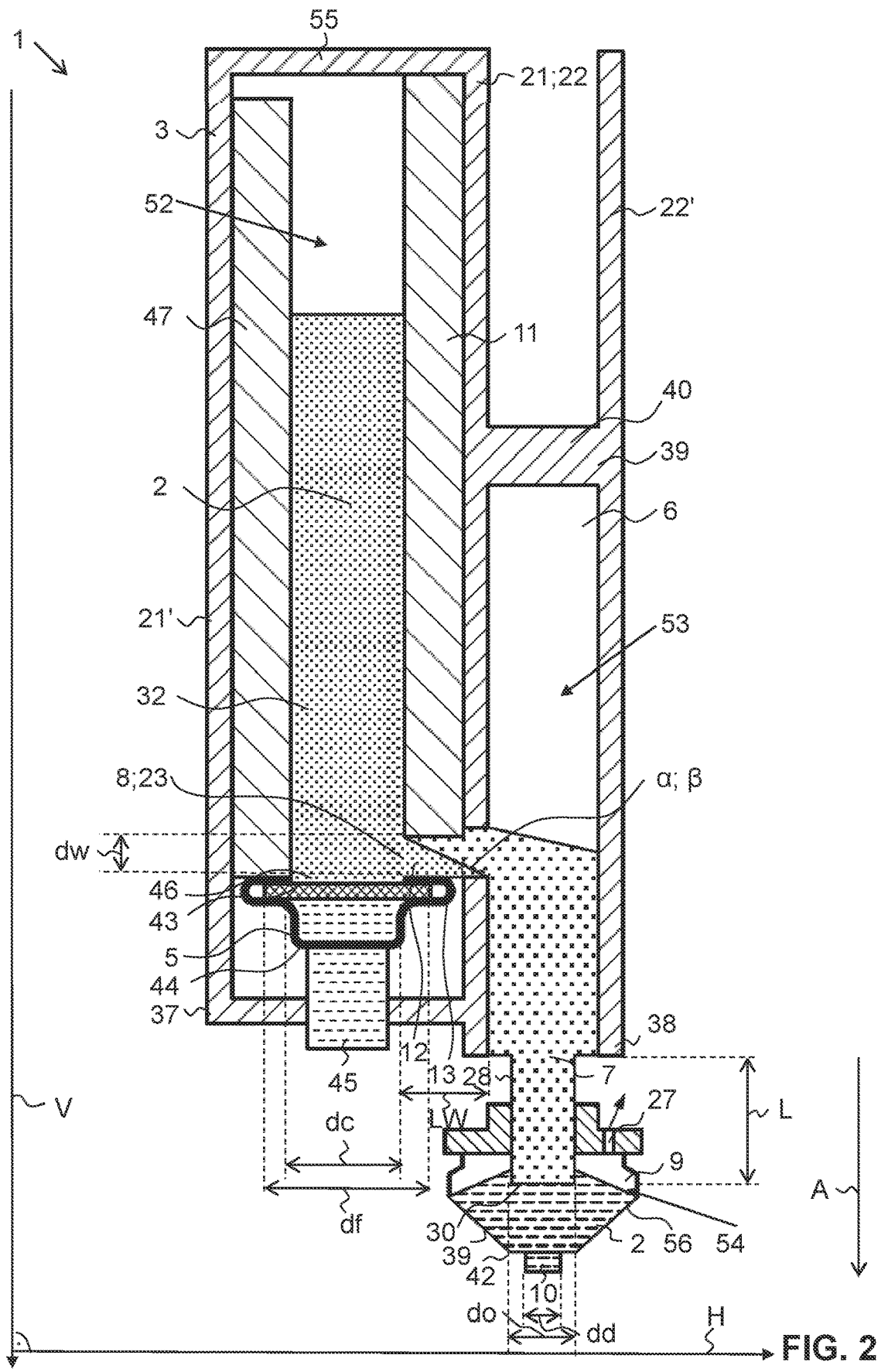
FIG. 2 shows a sectional view of the device according to a first embodiment at the position B-B of FIG. 1.
Figure 3:
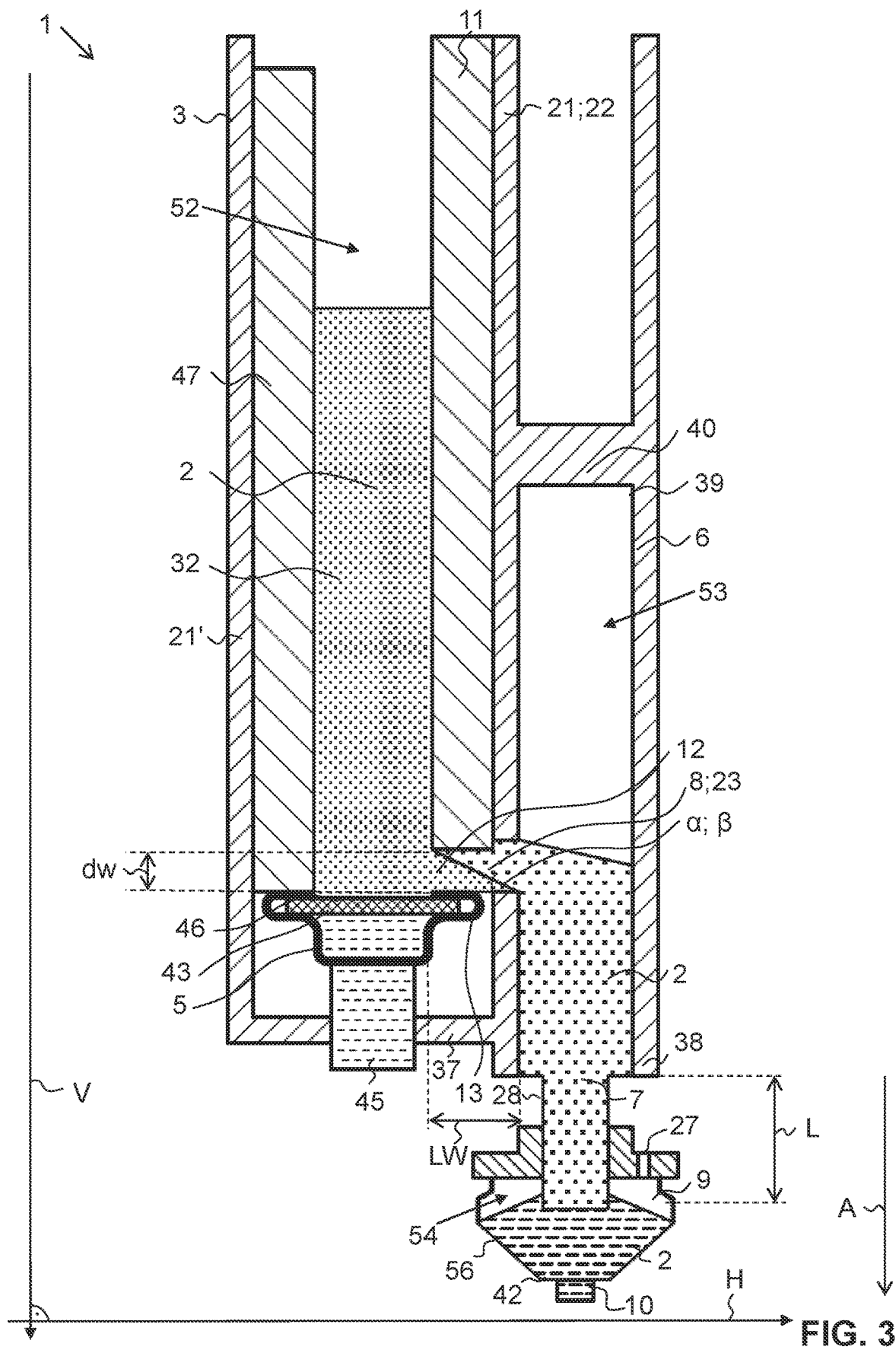
FIG. 3 shows a sectional view of the device according to a second embodiment at the position B-B of FIG. 1.
Figure 4:
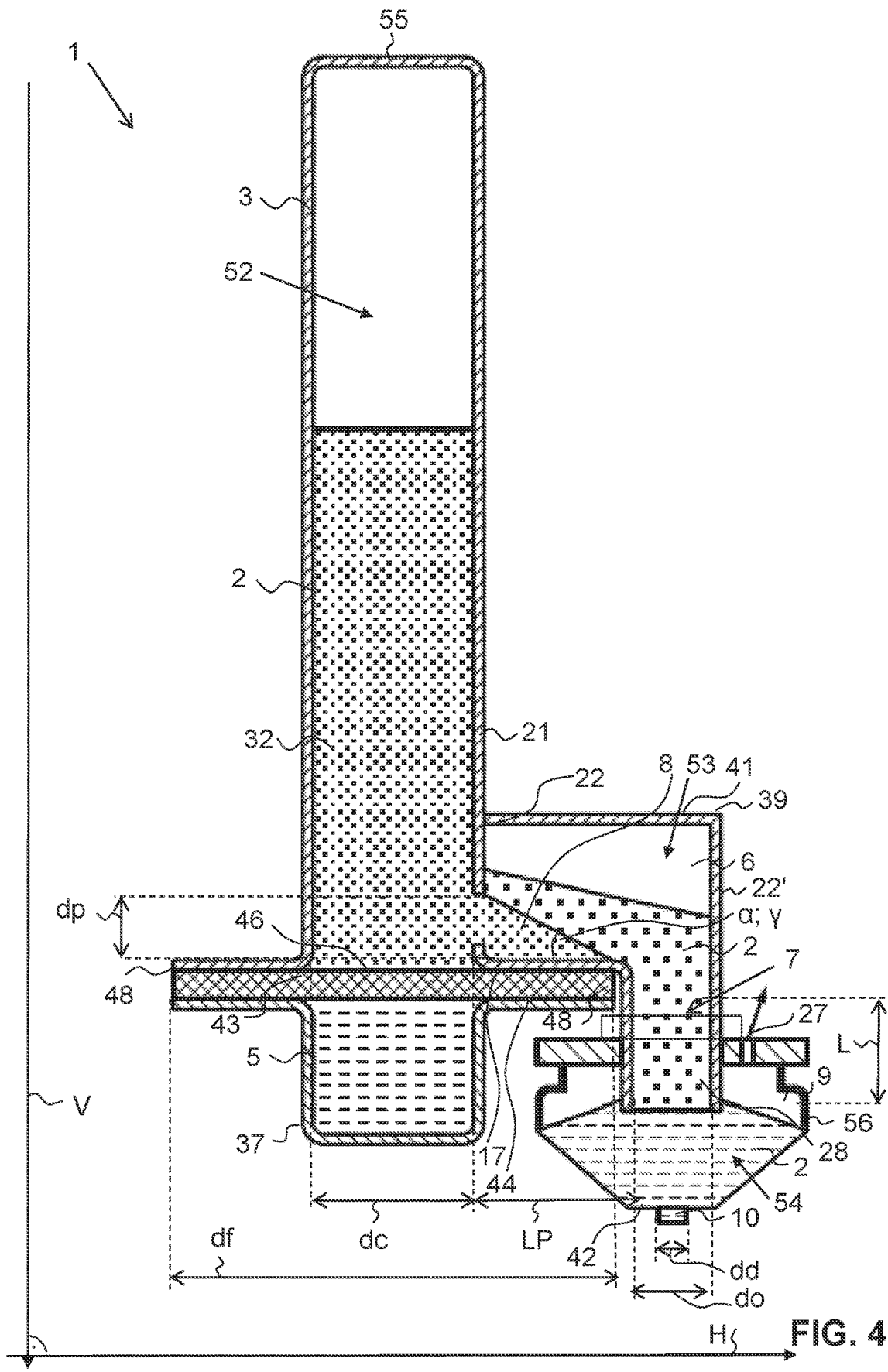
FIG. 4 shows a sectional view of the device according to a third embodiment at the position B-B of FIG. 1.
Figure 5:
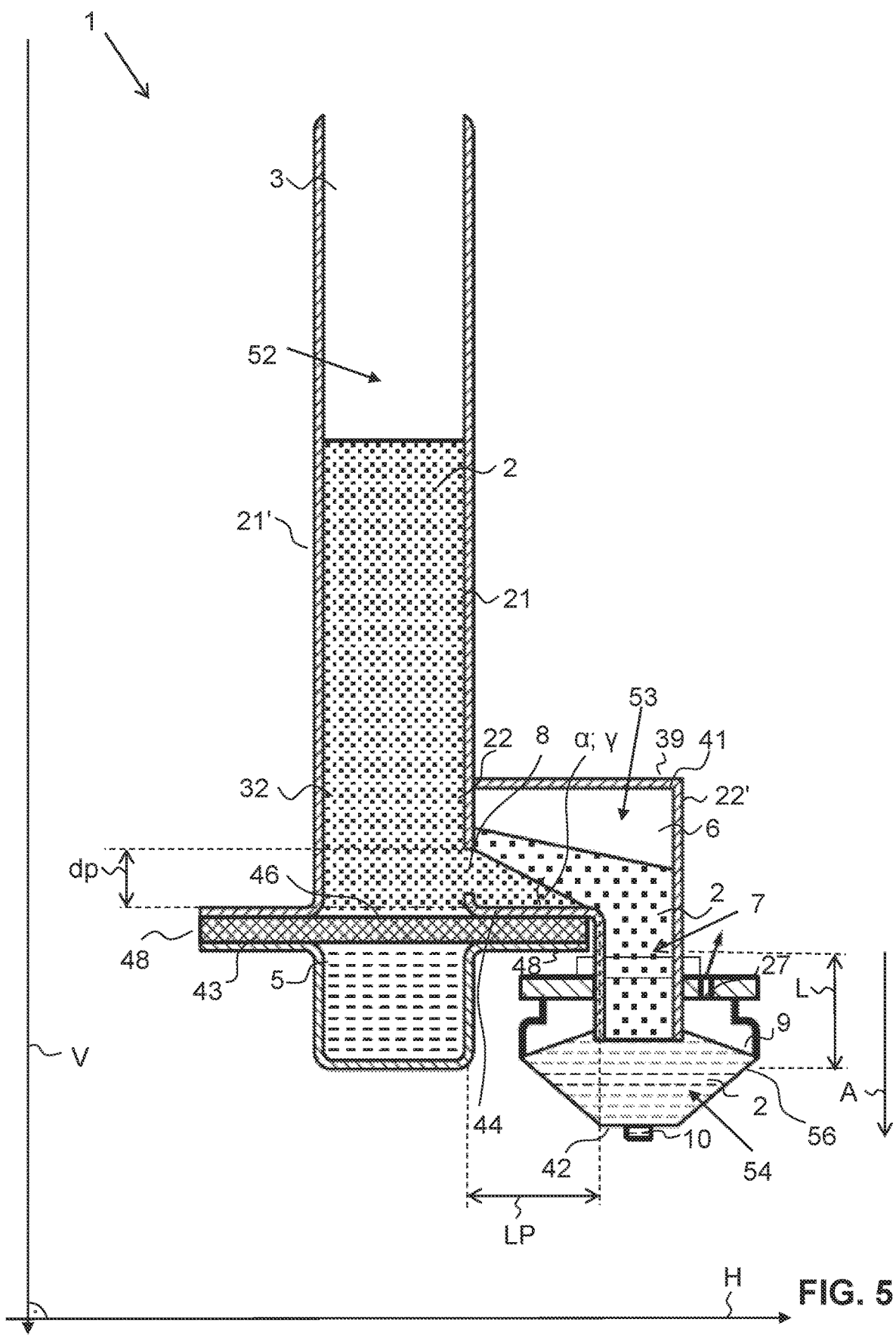
FIG. 5 shows a sectional view of the device according to a fourth embodiment at the position B-B of FIG. 1.
Figure 6:
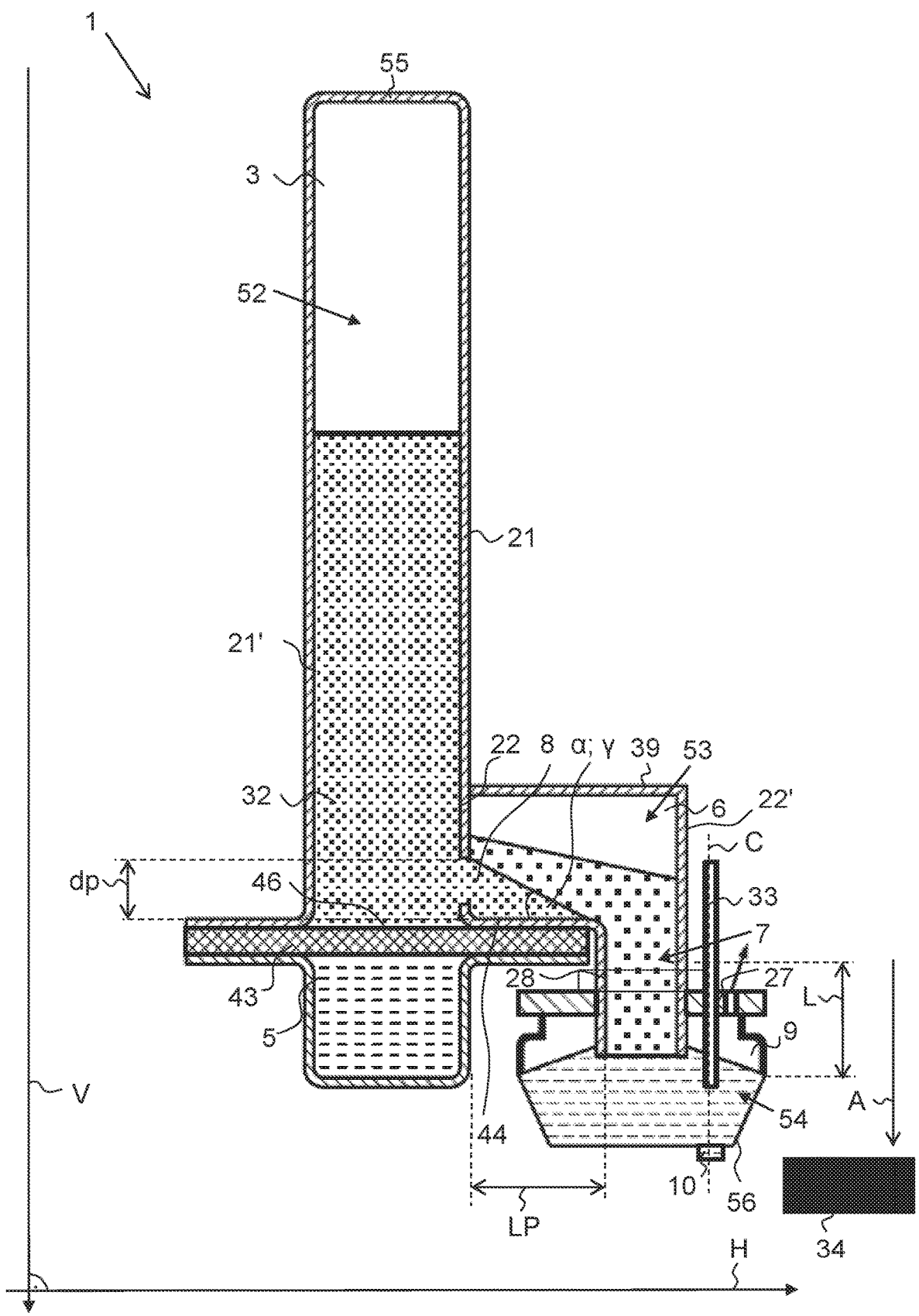
FIG. 6 shows a sectional view of the device according to a fifth embodiment at the position B-B of FIG. 1.

The second chamber 6 has, when viewed in the installed position, an outlet opening 7 provided in its underside 38, wherein the potentially fluidized powdery material 2 is dischargeable from the second chamber 6 via said outlet opening 7. Moreover, on its upper side 39, opposite the outlet opening 7, the second chamber 6 is closed off in an air-tight manner towards an outside. In the embodiments of FIGS. 2 and 3 this closure is provided by means of a closing element 40 that is placed within the second chamber 6. In the embodiments of FIGS. 4 to 6 said closure is provided by means of an upper wall 41 of the second chamber 6 itself. That is, in the former case the closure is provided by means of an additional component 40 whereas in the latter case the closure is an integral component of the second chamber 6. In any case this closure results in the fact that the second chamber 6 is capable of compensating a fluidizing pressure of the fluidizing gas so that the fluidized powdery material 2 within the second chamber 6 is potentially fluidized. If the powdery material 2 has been potentially fluidized in the first chamber 3 than the potentially fluidized powdery material 2 will of course remain potentially fluidized in the second chamber 6.

As mentioned initially the device 1 further comprises at least one third chamber 9, wherein the third chamber 9 is in connection with the second chamber 6 via the outlet opening 7 of the second chamber 6 such, that the potentially fluidized powdery material 2 that is present in the second chamber 6 is transportable from the second chamber 6 into the third chamber 9. Moreover, in the present case the third chamber 9 is configured to defluidize, i.e. to degas the potentially fluidized powdery material 2, whereby the powdery material 2 is reinstated in its initial state it has had in the buffer bin 36 and the weight bin 35. A defluidization or degassing is achieved here by means of at least one equalizing element 27 which is configured to at least partially remove the fluidizing gas from the third chamber 9. Said equalizing element 27 can be provided by means of at least one opening in the third chamber 9 through which the fluidizing gas is removable from the third chamber 9 and transferable to the outside. However, it is likewise conceivable to provide an equalizing element 27 that is configured to establish a fluid connection between the third chamber 9 and the processing device, and wherein the fluidizing gas is removable from the third chamber 9 and transferable to the processing device via said equalizing element 27. In this case a pressure within the third chamber 9 is varied so as to equal the pressure being present in the place where the powdery material 2 is finally charged to, here the processing device. However, it is likewise conceivable to defluidize the potentially fluidized powdery material in the absence of such an equalizing element, see below.

In order to discharge the defluidized powdery material 2 from the third chamber 9 a discharge element 10 in the form of a discharge opening is provided in the third chamber 9. In the depicted embodiments said discharge element 10 is provided in an under side 42 of the third chamber 9. Such an arrangement allows a discharging of the powder material 2 by means of gravity only. It is preferred that the outlet opening 7 of the second chamber 6 has a larger cross-section do than the cross-section dd discharge element 10 of the third chamber 9.

Additionally, the outlet opening 7 of the second chamber 6 and the third chamber 9 are in connection with one another via a pipe 28, wherein said pipe 28 extends from the outlet opening 7 of the second chamber 6 along an outlet direction A at least partially into a volume confined by the third chamber 9. As just mentioned above it is possible to defluidize the potentially fluidized powdery material 2 in the absence of an equalizing element. Namely, a defluidization of the potentially fluidized powdery material 2 can occur while said powdery material 2 travels from the second chamber 6 into the third chamber 9 via the pipe 28. The pipe 28 effectuates that the fluidizing gas escapes from the powdery material 2 within the pipe 28 and flows back into the second chamber 6. Furthermore, the pipe 28 has a length L along the outlet direction A being such, that a region 29 between a distal end 30 of the pipe 28 that is facing the third chamber 9 and an underside 42 of the third chamber 9 is delimited, wherein a sealing of the second chamber 6 against the third chamber 9 due to powdery material 2 being accumulated in said region 29 is enabled. That is, if potentially fluidized powdery material 2 is discharged from the second chamber 6 into the third chamber 9 it w % ill start accumulating within the volume confined by the third chamber 9. If discharging is continued until the accumulated powdery material 2 reaches the distal end 30 of the pipe 28, i.e. the powdery material 2 is accumulated in the said region 29, said powdery material 2 will act as a seal that seals the second chamber 6 against the third chamber 9.

As depicted in FIG. 6 it is conceivable to provide the device 1 with a cleaning device 33 that is configured to clean the discharge element 10 of the third chamber 9. In this way a clogging of the discharge element 10 can be prevented or, if already established, removed. To this end the discharge element 10 is preferably arranged laterally offset with respect to a central axis C running through the third chamber 9. Here, the cleaning device 33 is arranged laterally offset with respect to said central axis C, too, and it is provided by means of a piston 33 that can be displaced downwards and through the discharge element 10 in order to eject any powdery material 2 that has accumulated within the discharge element 10. Additionally, a detection device 34 is present which is configured to detect a condition of the discharge element 10 of the third chamber 9. For example, the detection device 34 can be configured to detect a discharging of the powdery material 2 through the discharge element 10, wherein an irregular or outstanding discharging is indicative of a clogged discharge element 10. The detection device 34 and the cleaning device 33 are preferably in communication with one another such that the detection device 34 can trigger a cleaning event in case that it detects a clogged discharge element 10. It should be understood that such a detection device 34 and/or cleaning device 33 can be present in any embodiment.

In FIGS. 2 to 6 a device 1 is depicted which in each case comprises a first chamber 3 having one channel 32 along which the powdery material 2 is transportable and fluidizable and/or potentially fluidizable by the fluidizing device 5. In these figures the fluidizing device 5 is provided by means of a gas-permeable element 43 which is mounted in a housing 44. The housing 44 in turn is mounted within the first chamber 3 and is formed with an inlet 45 being in connection with a gas supply line 31 through which the fluidizing gas is supplied to the fluidizing device 5. The gas-permeable element 43 can be an element as it is known in the art. For example, it can correspond to a fabric or textile, wherein the fluidizing gas can permeate through the pores of the fabric or textile. Other examples of the gas-permeable element are a grid or a porous wall. Said gas-permeable element 43 forms a transport surface 46 on which the powdery material 2 is transported in the first chamber 3 along the extension direction E. In order to ensure that the powdery material 2 is transportable along an entire length of the first chamber 3 the transport surface 46, i.e. the gas-permeable element, extends along the entire length of the first chamber 3, too. In addition, in order to ensure complete gassing of the powdery material 2 within the first chamber 3 a cross-section df of the gas-permeable element 43 is chosen to be equal to or, as it is the case in the depicted embodiments, to be larger than a cross-section dc of the channel 32. In FIGS. 2 and 3 the channel 32 is delimited by the limiting element 11 extending, apart from the region of the passage 8 in which the passageway 12 is formed, along the wall 21 of the first chamber 3 facing the second chamber 6 and a restriction element 47 in the form of a plate extending along the wall 21' of the first chamber 3 being opposite the second chamber 6, respectively. In FIGS. 4 and 5 the channel 32 is delimited directly by the walls 21, 21' of the first chamber 3, i.e. no limiting element 11 and restriction element 47 are required. Instead the walls 21, 21' of the first chamber 3 run laterally outwards in the region of the fluidizing device 5, wherein the fluidizing device is connected to the walls 21, 21' of the first chamber 3 in said laterally widened regions 48.

Figure 7:
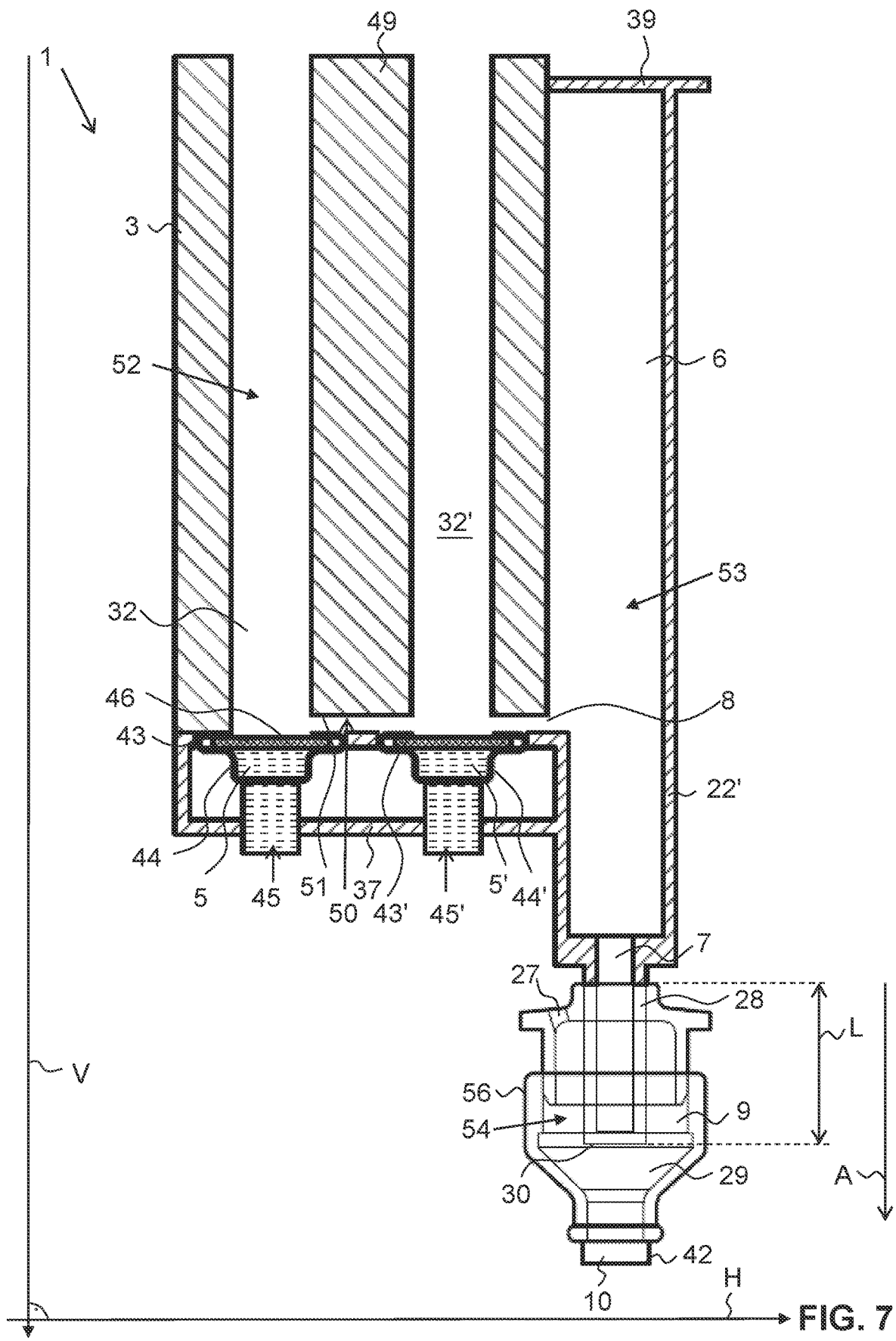
FIG. 7 shows a sectional view of the device according to a sixth embodiment at the position B-B of FIG. 1.

As follows from FIG. 7 it is conceivable that the first chamber 3 comprises two or more channels 32, 32' for the powdery material 2. For example, and as disclosed in FIG. 7, the first chamber 3 can comprise a first channel 32 and a second channel 32' which extend parallel to one another along the extension direction E. The channels 32, 32' are separated from one another by a separating element 49 which likewise extends along the extension direction E. In order to allow a communication between the two channels 32, 32' the separating element 49 leaves free a passage 50 at its underside 51. A fluidizing device 5, 5' is arranged within each channel 32, 32', wherein the fluidizing device 5 of the first channel is configured to transport the powdery material 2 along the first channel 32 and to fluidize and/or potentially fluidize the powdery material 2 within said first channel 32. The thus fluidized and/or potentially fluidized powdery material 2 is then transferred from the first channel 32 into the second channel 32' via the passage 50 being left free by the separating element 49. The fluidized and/or potentially fluidized powdery material 2 is then transferred from the second channel 32' into the second chamber 6 by means of the fluidizing device 5' arranged within the second channel 32'. Hence, whereas the fluidizing device 5 according to the embodiments depicted in FIGS. 2 to 6 is configured to perform a dual function, namely a fluidization and/or potential fluidization of the powdery material 2 as well as a transportation of the powdery material 2 along the single channel 32 and from the first chamber 3 into the second chamber 6, the fluidizing devices 5, 5' of the embodiment depicted in FIG. 7 perform in each case one function, namely a fluidization and/or potential fluidization of the powdery material 2 on the one hand side and a transportation from the first chamber 3 into the second chamber 6 on the other hand side. In FIG. 7 the two channels 32, 32' and the two fluidizing devices 5, 5' are arranged at the same height. However, it is likewise conceivable that these components are arranged at different heights. For example, the first fluidizing device 5 arranged in the first channel 32 could be arranged higher than the second fluidizing device 5' arranged in the second channel 32' when seen in the installed position. Such an arrangement simplifies a transportation of the powdery material 2 from the first channel 32 into the second channel 32' because use can be made from the slope established between the fluidizing devices 5, 5'.

In the embodiments shown herein the first chamber 3 and the second chamber 6 are located essentially at the same height and the third chamber 9 is located below the second chamber 6, and thus also below the first chamber 3, when seen in the installed position. Moreover, the passage 8 formed between the first chamber 3 and the second chamber 6 extends essentially horizontally whereas the pipe 28 extending from the second chamber 6 into the third chamber 9 extends essentially vertically. It should be noted that other arrangements are likewise conceivable. For example, the second chamber 6 could be arranged offset downwards with respect to the first chamber 3 and/or the passage 8 between the first chamber 3 and the second chamber 6 could run inclined downwards when seen from the first chamber 3 in the direction of the second chamber 6.

As mentioned initially the device 1 as depicted in FIG. 1 comprises several second chambers 6 and several third chambers 9 being in connection with the first chamber 3. For example, it is conceivable to provide two or more second chambers 6 and thus two more third chambers 9 being in each case in connection with one of the second chambers 6. Moreover, from these two or more second and third chambers it is conceivable that one or more second chambers 6 with their respective third chambers 9 are arranged on one longitudinal side of the first chamber 1 and one or more second chambers 6 with their respective third chambers 9 are arranged on the opposite longitudinal side of the first chamber 1. The first, second and third chambers 3, 6, 9 as well as their components such as the receiving opening 4, the outlet opening 7, the length of the passage 8, the length of the pipe 28, etc. can be provided with different dimensions. Moreover, a preselection of various amounts of powdery material 2 to be discharged from the weight bin 35 into the first chamber 3 are possible. Depending on the number and the dimensions of the chambers 3, 6, 9 and their components as well as the preselected amount of powdery material 2 different feeding conditions can be obtained.

Figure 8:
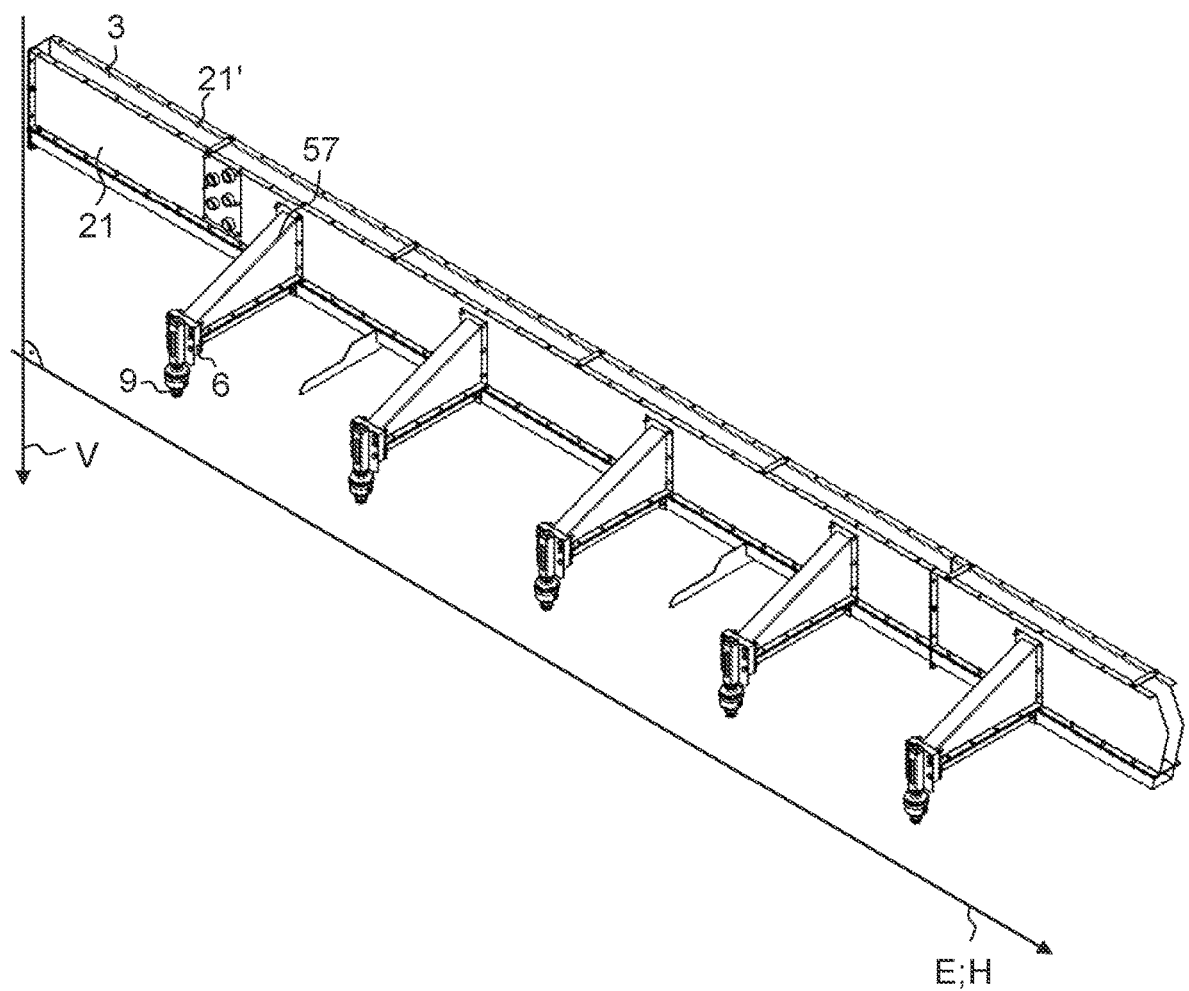
FIG. 8 shows a perspective view of the device according to FIG. 1 that further comprises an intermediate device.
Figure 9:
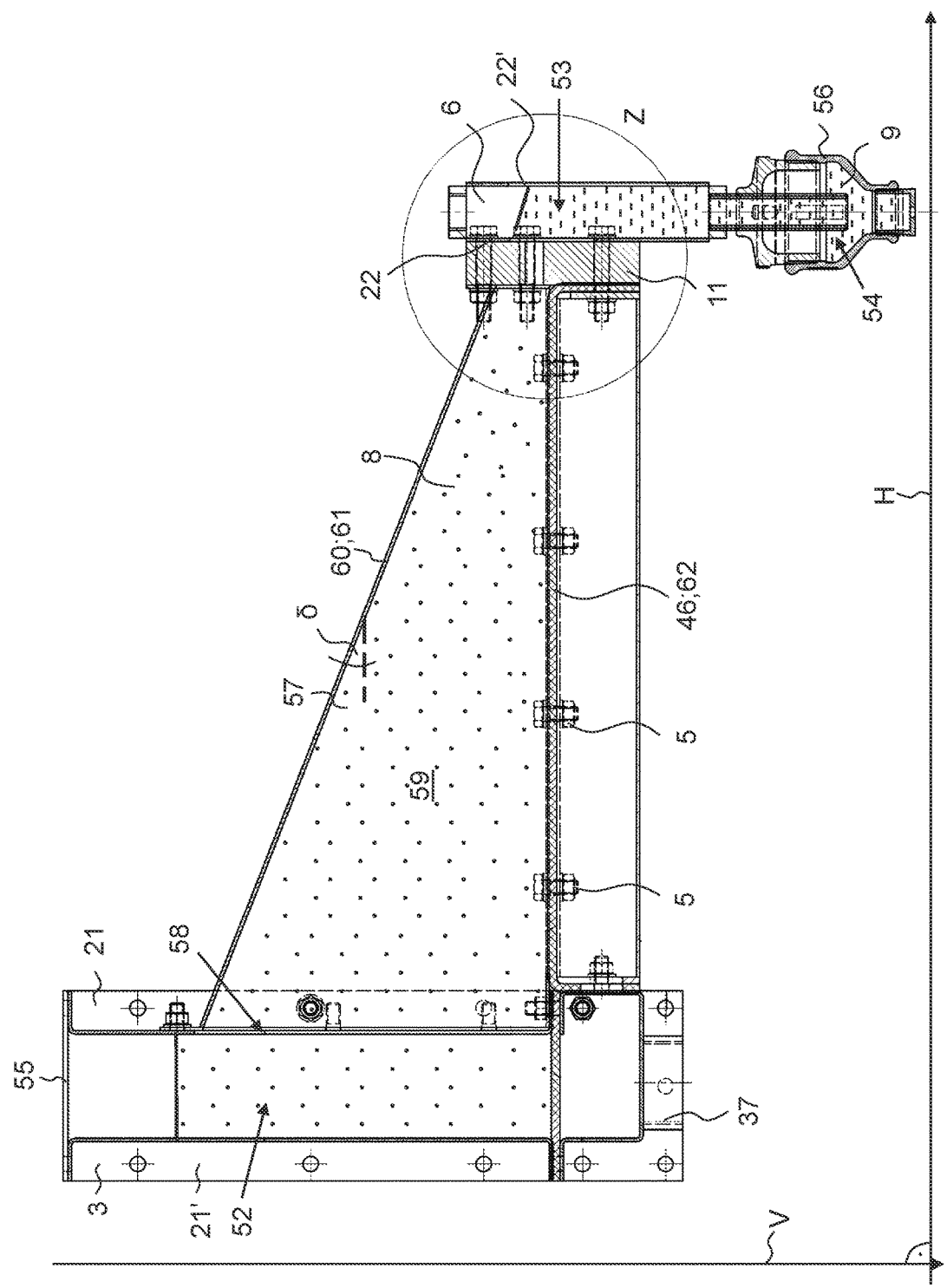
FIG. 9 shows a sectional view through the device according to FIG. 8.
Figure 10:
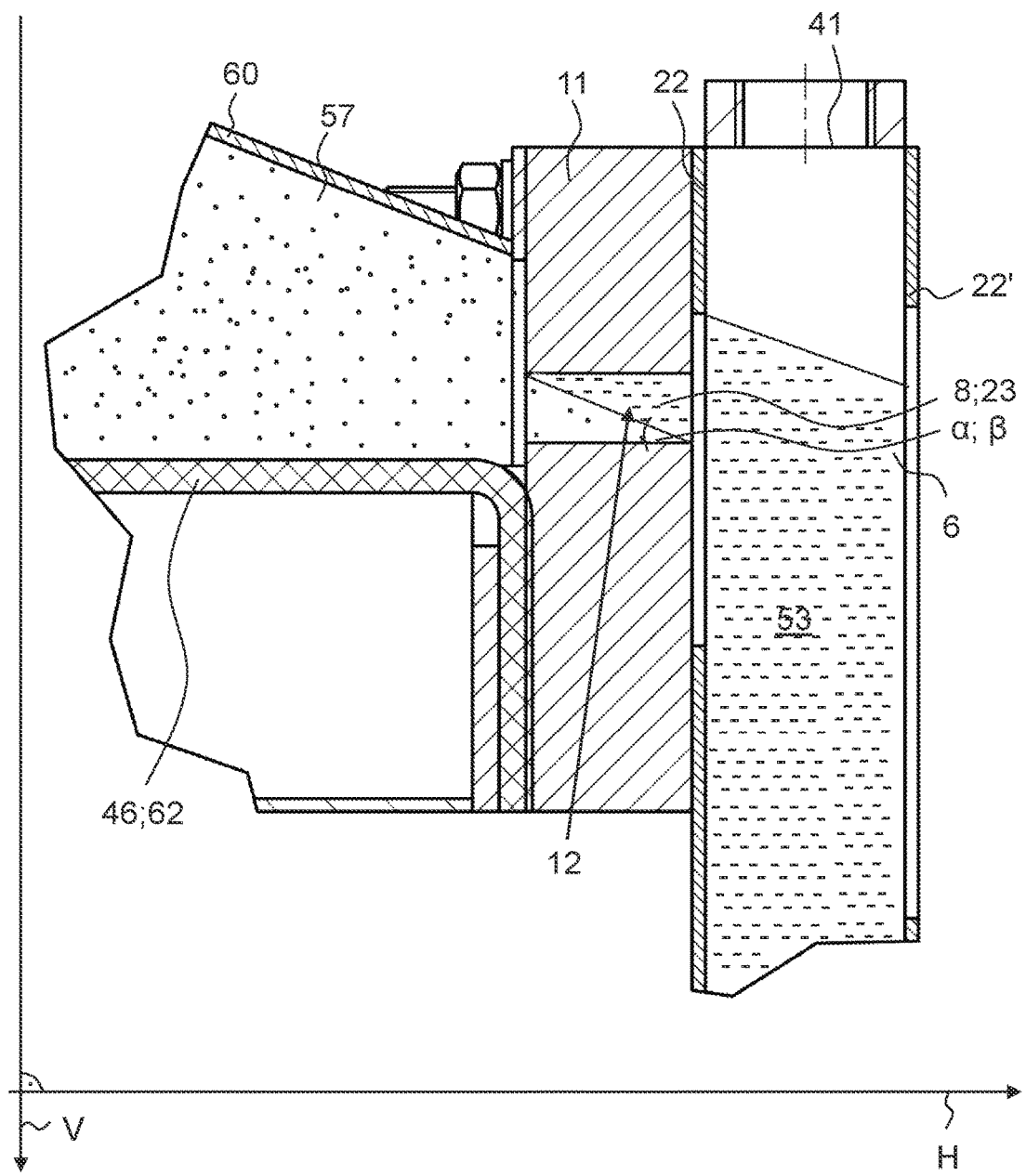
FIG. 10 shows an enlarged view of the region Z of FIG. 9.

FIGS. 8 to 10 depict a device 1 that furthermore comprises an intermediate device 57 that is arranged between the first chamber 3 and the second chamber 6. To this end the intermediate device 57 has the shape of a tube or pipe which is connected to the first chamber 3 on the one side and to the limiting element 11 on the other side. The limiting element 11 in turn is connected to the second chamber 6. In this case a connection between the first chamber 3 and the second chamber 6 is established via a transfer opening 58 in the wall 21 of the first chamber 3 which enables a communication between the first chamber 3 and an interior 59 of the intermediate device 57. Additionally, the passage 8 is encompassed by the intermediate device 57 and the interior 59 of the intermediate device 57 is in connection with the passageway 12 that is delimited by the limiting element 11. Said passageway 12 furthermore leads into the second chamber 6. Hence, the intermediate device 57 can be seen as a spacer or separator that enables a horizontal spacing or separation between the first chamber 3 and the second chamber 6 with respect to the horizontal direction H. Moreover, and as best seen in FIG. 9, the intermediate device 57 comprises several fluidizing devices that are configured to fluidize and/or potentially fluidize the powdery material by a fluidizing gas as described above. Hence, these fluidizing devices 5 ensure that the powdery material is maintained in its fluidized or potentially fluidized state while it is transferred from the first chamber 3 into the second chamber 6 via the intermediate device 57.

The intermediate device 57 is furthermore configured to deflect or guide fluidizing gas from the intermediate device 57 into the first chamber 3. To this end the intermediate device 57 comprises a deflection element 60 which is arranged here above the fluidizing devices 5 when the device 1 is seen in the installed position. The deflection element 60 is configured as an integral part of the intermediate device 57 and corresponds to an upper wall 61 of the intermediate device 57. In order to be able to guide or deflect fluidizing gas into the first chamber 3 the deflection element 60 or the upper wall 61, respectively, is arranged inclined with respect to the horizontal direction H. In fact, when seen from the first chamber 3 towards the second chamber 6 along the horizontal direction H said deflection element 60 or upper wall 61 of the intermediate device 57 runs downward. Thereby, an angle of inclination, which is referred herein as venting angle S is formed between the deflection element 60 or the upper wall 61 and a bottom 62 of the intermediate device. Said bottom 62 corresponds here to the transport surface 46 on which the powdery material 2 is transported. Moreover, the venting angle S corresponds here to about 30°. Besides, it is noted that FIGS. 9 and 10 in each case depict a deflection device whose bottom part, i.e. the transport surface 46 and the bottom wall 62, extend along the horizontal direction H. However, it is likewise conceivable that said bottom part is arranged inclined downward with respect to the horizontal direction H and when seen from the first chamber 3 towards the second chamber 6.

The invention claimed is:

1. A device for feeding a processing device with powdery material comprising:
   a first chamber having a receiving opening for receiving the powdery material within the first chamber and at least one fluidizing device configured to at least one of fluidize and to potentially fluidize the powdery material within the first chamber by a fluidizing gas;
   at least one second chamber having an outlet opening, wherein the second chamber is in connection with the first chamber via a passage, such that at least one of the fluidized and the potentially fluidized powdery material is transportable from the first chamber into the second chamber,
   wherein the second chamber is closed off in an air-tight manner towards an outside such, that the second chamber is capable of compensating a fluidizing pressure of the fluidizing gas so that at least one of the fluidized powdery material within the second chamber is potentially fluidized and the potentially fluidized powdery material within the second chamber remains potentially fluidized, and
   wherein the potentially fluidized powdery material is dischargeable from the second chamber via the outlet opening; and
   at least one third chamber, wherein the third chamber is in connection with the second chamber via the outlet opening such, that the potentially fluidized powdery material is transportable from the second chamber into the third chamber,
   wherein the device is configured such, that the potentially fluidized powdery material is defluidized and is present as defluidized powdery material in the third chamber, and
   wherein the third chamber has a discharge element configured to discharge the defluidized powdery material.

2. The device according to claim 1, wherein the first chamber is closed off in an essentially air-tight manner towards the outside and configured to potentially fluidize the powdery material, or
   wherein the first chamber is at least partially opened towards the outside and configured to fluidize the powdery material.

3. The device according to claim 1 being configured to maintain the powdery material under its angle of repose within the first chamber in the absence of the fluidizing gas.

4. The device according to claim 1, wherein the first chamber and the second chamber are arranged immediately adjacent to one another, or
   wherein the first chamber and the second chamber are arranged at a lateral distance from one another.

5. The device according to claim 1, wherein the passage is provided by a through-opening extending through a wall of the first chamber and a wall of the second chamber, or
   wherein the passage is provided by a tube extending between an opening in the wall of the first chamber and an opening in the wall of the second chamber.

6. The device according to claim 1, wherein the third chamber comprises at least one equalizing element being configured to discharge the fluidizing gas from the third chamber, whereby the potentially fluidized powdery material is defluidized.

7. The device according to claim 1, wherein a cross-section of the outlet opening of the second chamber is larger than a cross-section of the discharge element of the third chamber.

8. The device according to claim 1, wherein the outlet opening of the second chamber and the third chamber are in connection with one another via a pipe, and wherein the pipe extends from the outlet opening of the second chamber along an outlet direction at least partially into a volume of the third chamber.

9. The device according to claim 8, wherein the pipe has a length along the outlet direction being such, that a region between an end of the pipe that is facing the third chamber and an underside of the third chamber is delimitted, wherein a sealing of the second chamber against the third chamber due to powdery material being accumulated in said region is achieved.

10. The device according to claim 1, wherein the first chamber comprises at least one channel along which the powdery material is transportable and at least one of fluidizable and potentially fluidizable by the fluidizing device, wherein the fluidizing device comprises a gas-permeable element, and
    wherein a cross-section of the channel essentially equals a cross-section of the gas-permeable element, or
    wherein a cross-section of the gas-permeable element is larger than a cross-section of the channel.

11. The device according to claim 1, further comprising at least one of a cleaning device configured to clean the discharge element of the third chamber and a detection device configured to detect a condition of the discharge element of the third chamber.

12. The device according to claim 1, wherein the first chamber comprises at least two channels being in communication with one another and at least two fluidizing devices,
    wherein in each case one fluidizing device is arranged in one channel, and
    wherein one of the fluidizing devices is configured to transport and at least one of fluidize and potentially fluidize the powdery material and the other of the fluidizing devices is configured to transport the at least one of fluidized and potentially fluidized powdery material from the first chamber into the second chamber.

13. The device according to claim 1, wherein at least one of i) the first chamber and the second chamber are located at a same height or at a different height when seen in the installed position, and
  ii) wherein the third chamber is located below the second chamber when seen in the installed position.

14. The device according to claim 1, wherein the first chamber has an essentially elongated shape extending along an extension direction, and wherein two or more second chambers and two or more third chambers are arranged at a distance from one another along the extension direction.

15. A method for feeding a processing device with powdery material using a device as claimed in claim 1, the method comprising the steps of:
  Providing powdery material into the first chamber;
  At least one of fluidizing and potentially fluidizing the powdery material within the first chamber by introducing fluidizing gas from the fluidizing device into the first chamber;
  Transporting the at least one of fluidized and potentially fluidized powder material from the first chamber into the second chamber, whereby at least one of the fluidized powder material is potentially fluidized and the potentially fluidized powdery material remains potentially fluidized;
  Discharging the potentially fluidized powdery material from the second chamber into the third chamber;
  Defluidizing the potentially fluidized powdery material such that it is present as defluidized powdery material in the third chamber; and
  Discharging the defluidized powdery material from the third chamber.

16. The device according to claim 1, wherein the powdery material is bulk material.

17. The device according to claim 3, wherein the first chamber in a region of the passage comprises or is in connection with a limiting element limiting a passageway formed between the limiting element and the first chamber, and wherein a ratio between a cross-section of the passageway and a length of an underside of the passageway relate to an angle that equals to or is smaller than the angle of repose of the powdery material, or
  wherein a ratio between a cross-section of the passage and a length of an underside of the passage relate to an angle that equals to or is smaller than the angle of repose of the powdery material.

18. The device according to claim 6, wherein at least one of i) the at least one equalizing element is provided by means of at least one opening in the third chamber through which the fluidizing gas is removable from the third chamber and transferable to the outside, and
  ii) wherein the at least one equalizing element is configured to establish a fluid connection between the third chamber and the processing device, and wherein the fluidizing gas is removable from the third chamber and transferable to the processing device via said equalizing element.

19. The method according to claim 15, wherein the powdery material is bulk material.

20. The device according to claim 1, wherein the second chamber is closed off in an air-tight manner towards the outside via a closing element that is placed within the second chamber, or
  wherein the second chamber is closed off in an air-tight manner towards the outside via an upper wall of the second chamber itself.

21. A device for feeding a processing device with powdery material comprising:
  a first chamber having a receiving opening for receiving the powdery material within the first chamber and at least one fluidizing device configured to at least one of fluidize and to potentially fluidize the powdery material within the first chamber by a fluidizing gas;
  at least one second chamber having an outlet opening, wherein the second chamber is in connection with the first chamber via a passage, such that at least one of the fluidized and the potentially fluidized powdery material is transportable from the first chamber into the second chamber,
  wherein the second chamber is closed off in an air-tight manner towards an outside such, that the second chamber is capable of compensating a fluidizing pressure of the fluidizing gas so that at least one of the fluidized powdery material within the second chamber is potentially fluidized and the potentially fluidized powdery material within the second chamber remains potentially fluidized, and
  wherein the potentially fluidized powdery material is dischargeable from the second chamber via the outlet opening; and
  at least one third chamber, wherein the third chamber is in connection with the second chamber via the outlet opening such, that the potentially fluidized powdery material is transportable from the second chamber into the third chamber,
  wherein the device is configured such, that the potentially fluidized powdery material is defluidized and is present as defluidized powdery material in the third chamber,
  wherein the third chamber has a discharge element configured to discharge the defluidized powdery material, and
  wherein the third chamber comprises at least one equalizing element being configured to discharge the fluidizing gas from the third chamber, whereby the potentially fluidized powdery material is defluidized.

* * * * *